United States Patent
Nakayama

(10) Patent No.: US 9,738,471 B2
(45) Date of Patent: Aug. 22, 2017

(54) AUTOMATIC DOCUMENT FEEDER AND IMAGE FORMING APPARATUS INCLUDING THE SAME

(71) Applicant: KYOCERA Document Solutions Inc., Osaka (JP)

(72) Inventor: Toru Nakayama, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/036,532

(22) PCT Filed: Apr. 10, 2015

(86) PCT No.: PCT/JP2015/061242
§ 371 (c)(1),
(2) Date: May 13, 2016

(87) PCT Pub. No.: WO2015/182262
PCT Pub. Date: Dec. 3, 2015

(65) Prior Publication Data
US 2016/0297634 A1 Oct. 13, 2016

(30) Foreign Application Priority Data
May 30, 2014 (JP) ................... 2014-112494

(51) Int. Cl.
*B65H 5/06* (2006.01)
*H04N 1/00* (2006.01)
(Continued)

(52) U.S. Cl.
CPC .............. *B65H 5/068* (2013.01); *B65H 5/06* (2013.01); *B65H 5/062* (2013.01); *G03G 15/00* (2013.01);
(Continued)

(58) Field of Classification Search
CPC .......... B65H 5/062; B65H 5/06; B65H 5/068; H04N 1/00543; H04N 1/00551;
(Continued)

(56) References Cited

U.S. PATENT DOCUMENTS

| 4,589,758 A * | 5/1986 | Kasama ............. G03G 15/2092 219/216 |
| 8,587,848 B2 * | 11/2013 | Nose .................... B65H 3/5223 358/474 |
| 2015/0090561 A1 * | 4/2015 | Mimoto ................. B41J 3/4071 198/780 |

FOREIGN PATENT DOCUMENTS

| JP | 2000-206740 A | 7/2000 |
| JP | 2004210480 A * | 7/2004 |

(Continued)

OTHER PUBLICATIONS

International Search Report of PCT/JP2015/061242 mailed Jun. 30, 2015.

*Primary Examiner* — Luis A Gonzalez
(74) *Attorney, Agent, or Firm* — Studebaker & Brackett PC

(57) ABSTRACT

An automatic document feeder (300) includes a housing (301), conveyance roller pairs (313 to 317), and a pressure releasing mechanism. The housing (301) is openably/closably attached to a main body of an image forming apparatus. The conveyance roller pairs (313 to 317) pinch an original document sheet with pressure and feed the original document sheet. The pressure releasing mechanism detaches one rollers (313b to 317b) of the conveyance roller pairs (313 to 317) from the other rollers (313a to 317a) in conjunction with an operation of opening the housing 301 against the main body.

5 Claims, 8 Drawing Sheets

(51) Int. Cl.
*G03G 21/16* (2006.01)
*G03G 15/00* (2006.01)

(52) U.S. Cl.
CPC ....... *G03G 15/602* (2013.01); *G03G 15/6508* (2013.01); *G03G 21/1633* (2013.01); *G03G 21/1638* (2013.01); *H04N 1/00* (2013.01); *H04N 1/00543* (2013.01); *H04N 1/00551* (2013.01); *H04N 1/00554* (2013.01); *H04N 1/00588* (2013.01); *G03G 2215/00189* (2013.01); *H04N 2201/0081* (2013.01); *H04N 2201/0091* (2013.01)

(58) Field of Classification Search
CPC ............. H04N 1/00554; G03G 21/633; G03G 21/1638; G03G 21/1628; G03G 21/16231
See application file for complete search history.

(56) References Cited

FOREIGN PATENT DOCUMENTS

| | | |
|---|---|---|
| JP | 2005-263400 A | 9/2005 |
| JP | 2008-083140 A | 4/2006 |
| JP | 2011-088728 A | 5/2011 |

\* cited by examiner

AUTOMATIC DOCUMENT FEEDER AND IMAGE FORMING APPARATUS INCLUDING THE SAME

TECHNICAL FIELD

The present invention relates to an automatic document feeder, and an image forming apparatus including the same.

BACKGROUND ART

An automatic document feeder (ADF) is provided on an upper surface of a main body of an image forming apparatus such as a copier or a printer, so as to automatically feed an original document sheet through a document reading region of the main body (see, for example, Patent Literatures 1 and 2). The main body includes contact glass. A main surface of the contact glass corresponds to a part of the upper surface of the main body. A part of the contact glass is used as the document reading region for reading an image from an original document sheet fed by the automatic document feeder. Alternatively, the main body includes main contact glass and sub contact glass in some cases. A main surface of the main contact glass and a main surface of the sub contact glass together correspond to a part of the upper surface of the main body, and the sub contact glass is disposed adjacent to the main contact glass. In this case, the sub contact glass is used as the document reading region for reading an image from an original document sheet fed by the automatic document feeder. The automatic document feeder is openably/closably attached to the main body so that an original document sheet can be placed on the contact glass or the main contact glass.

Besides, in the automatic document feeder, a paper feed tray attached to a housing and an exit tray provided in the housing overlap each other in the vertical direction in general, and the paper feed tray and the exit tray are connected to each other through a substantially U-shaped document conveyance path. Accordingly, the document conveyance path includes a conveyance path on the upstream side from a U-turn position for an original document sheet and a conveyance path on the downstream side from the U-turn position for the original document sheet, and the upstream conveyance path and the downstream conveyance path overlap each other in the vertical direction. An original document sheet set on the paper feed tray is fed to the document conveyance path, makes a U-turn in the middle, and then passes the document reading region of the main body to be discharged onto the exit tray.

Besides, the housing of the automatic document feeder includes a cover (a top cover) for unjamming processing in many cases, and when the top cover is opened, the upstream conveyance path is exposed outside. Furthermore, the top cover rotatably supports one roller of a conveyance roller pair provided in the upstream conveyance path in some cases. In such cases, when the top cover is opened, a contact between the two rollers of the conveyance roller pair provided in the upstream conveyance path is released. Accordingly, if an original document sheet is jammed in the automatic document feeder, a user can release nip (pinch with pressure) of the conveyance roller pair of the upstream conveyance path by opening the top cover, so as to remove the original document sheet from the automatic document feeder (the housing) by pulling the original document sheet with his/her hand.

CITATION LIST

Patent Literature

[Patent Literature 1]
Japanese Patent Application Laid-Open Publication No. 2000-206740
[Patent Literature 2]
Japanese Patent Application Laid-Open Publication No. 2005-263400

SUMMARY OF INVENTION

Technical Problem

It is, however, when the original document sheet is in a position where it can be visually found and can be pinched with fingers that the user can remove the original document sheet with his/her hand. Accordingly, when the original document sheet has turned into the downstream conveyance path, even if the top cover is opened, the user cannot visually find the jammed original document sheet and cannot remove the original document sheet with his/her hand. On the other hand, in such a case, a part of the original document sheet may be exposed in a position corresponding to the document reading region of the main body on a lower surface of the housing of the automatic document feeder. Therefore, the user may try to lift the automatic document feeder to remove the original document sheet from the bottom side of the automatic document feeder. In this case, however, the original document sheet is nipped (pinched with pressure) by a conveyance roller pair provided in the downstream conveyance path, and hence, the original document sheet may be damaged if the user tries to forcedly remove the original document sheet.

Besides, if an original document sheet of a comparatively large size is jammed, a part (a portion on the rear end side) of the original document sheet having turned into the downstream conveyance path may be visually found in some cases. In such cases, however, the nip (the pinch with pressure) of the conveyance roller pair is not released in the downstream conveyance path, and hence the original document sheet may be damaged if the user tries to forcedly remove the original document sheet.

In consideration of the above-described problem, an object of the present invention is to provide an automatic document feeder in which an original document sheet can be easily removed by opening a housing of the automatic document feeder against a main body of an image forming apparatus, and an image forming apparatus including the same.

Solution to Problem

An automatic document feeder of the present invention includes a housing, a conveyance roller pair, and a pressure releasing mechanism. The housing is openably/closably attached to a main body of an image forming apparatus. The conveyance roller pair pinches an original document sheet with pressure and feeds the original document sheet. The pressure releasing mechanism releases a pinching pressure of the conveyance roller pair, or detaches one roller of the conveyance roller pair from the other roller in conjunction with an operation of opening the housing against the main body.

An image forming apparatus of the present invention includes the above-described automatic document feeder and main body. The main body has a document reading section reading an image from an original document sheet fed by the automatic document feeder. Besides, the main body forms an image on a recording medium on the basis of a signal generated by the document reading section.

Advantageous Effects of Invention

According to the present invention, an original document sheet can be easily removed by opening a housing of an automatic document feeder against a main body of an image forming apparatus.

DESCRIPTION OF EMBODIMENT

Figure 1:
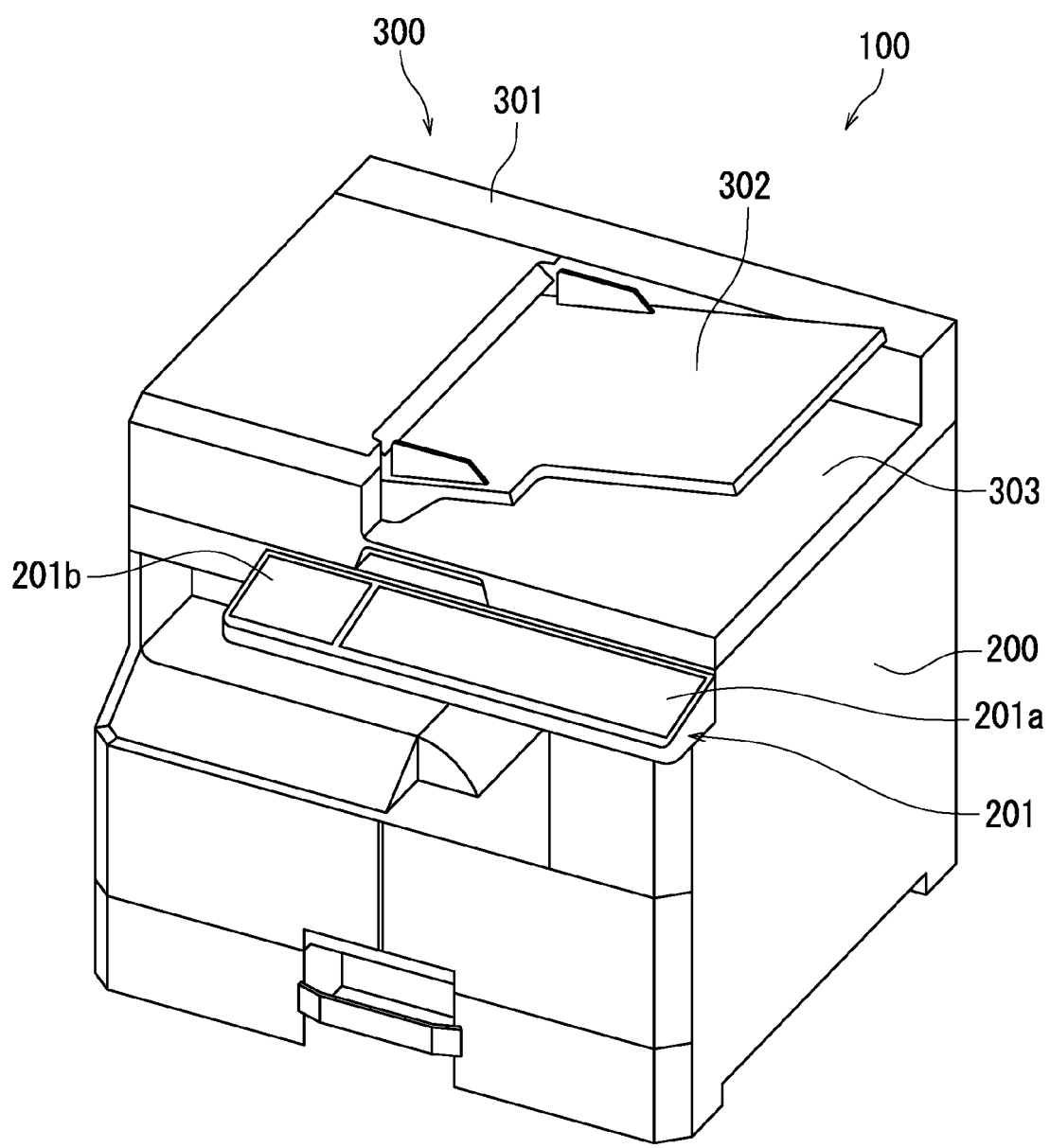
FIG. 1 is a perspective view of the appearance of an image forming apparatus according to an embodiment of the present invention.

An embodiment of the present invention will now be described with reference to the accompanying drawings. It is noted that like reference numerals are used to refer to like or corresponding elements in these drawings to avoid redundant description. Besides, in these drawings, composing elements are mainly schematically illustrated so as to be easily understood. Accordingly, the thicknesses, the lengths and the like of the respective composing elements illustrated in the drawings are different from the actual ones for convenience of drawing.

Figure 2:
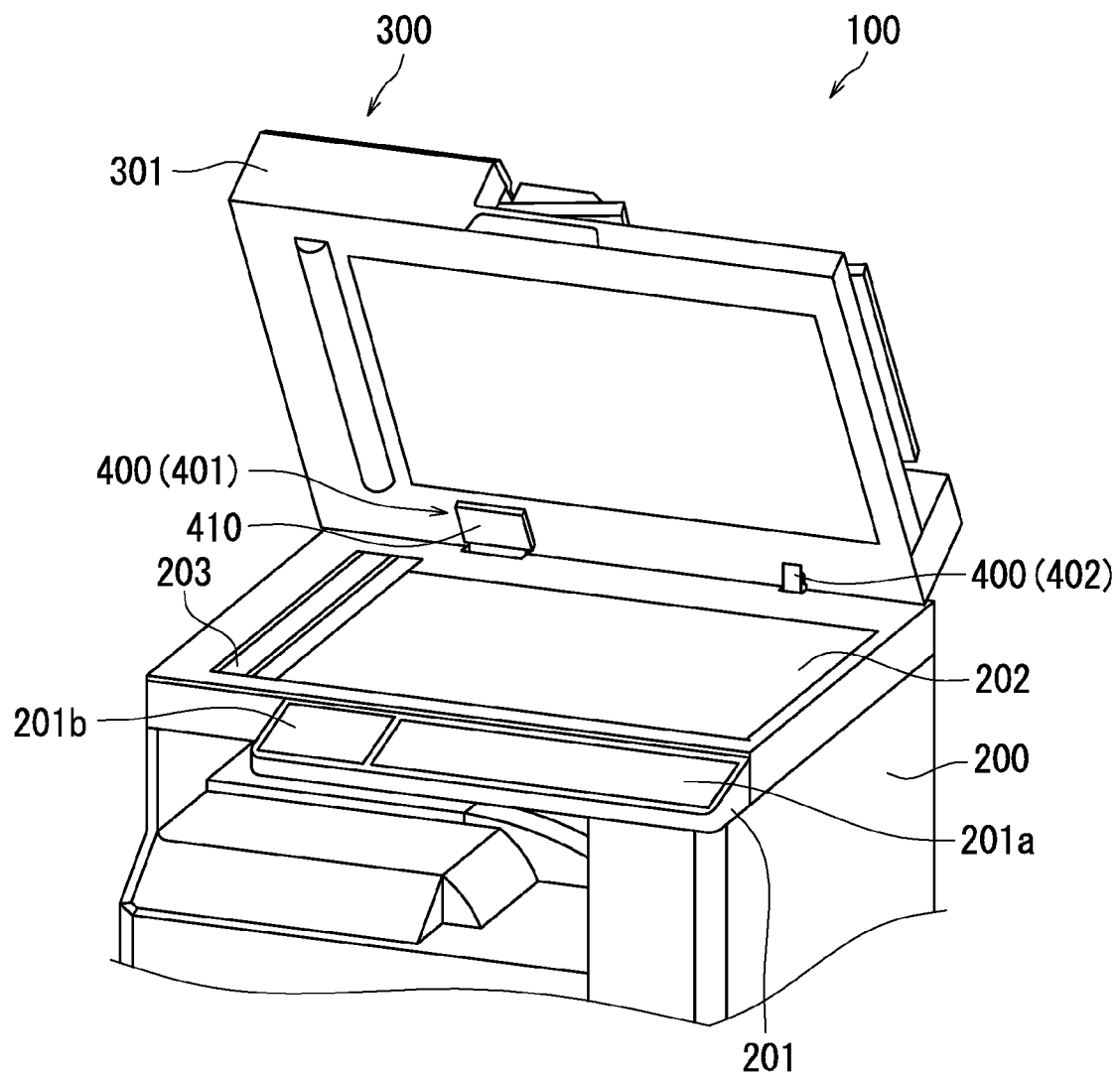
FIG. 2 is a perspective view of a state where an automatic document feeder according to the embodiment of the present invention is lifted.

FIG. 1 is a perspective view of the appearance of an image forming apparatus according to the present embodiment, and FIG. 2 is a perspective view of a state where an automatic document feeder of the present embodiment is lifted. In the present embodiment, description will be made on the assumption that the image forming apparatus is a multifunction peripheral.

As illustrated in FIG. 1, the image forming apparatus 100 includes a main body 200, and the automatic document feeder 300 provided on an upper surface of the main body 200. The main body 200 includes an operation display unit 201, the operation display unit 201 includes an operation section 201a and a display section 201b. The operation section 201a includes hard keys, and the display section 201b includes a liquid crystal display. The operation section 201a inputs, in accordance with an operation performed by a user, various information to a controller provided inside the main body 200. The display section 201b displays various information in accordance with control instructions issued from the controller. It is noted that the operation section 201a may be constituted by a touch panel.

As illustrated in FIG. 2, a housing 301 of the automatic document feeder 300 is openably/closably attached to the main body 200. Specifically, the housing 301 of the automatic document feeder 300 is openably/closably attached to the main body 200 with a plurality of hinge portions 400 (that is, a first hinge portion 401 and a second hinge portion 402 in the present embodiment). Besides, the main body 200 includes main contact glass 202. A main surface of the main contact glass 202 corresponds to a part of the upper surface of the main body 200. After placing an original document sheet on the main contact glass 202, when a user inputs an instruction to read the original document sheet by operating the operation section 201a, the main body 200 reads an image from the original document sheet to form an image on a recording medium such as paper. In this case, the automatic document feeder 300 functions as an original cover member by closing the housing 301 of the automatic document feeder 300.

Besides, the main body 200 further includes sub contact glass 203 disposed adjacent to the main contact glass 202. A main surface of the sub contact glass 203 corresponds, together with the main surface of the main contact glass 202, to a part of the upper surface of the main body 200. The sub contact glass 203 is used for reading an image from an original document sheet fed by the automatic document feeder 300.

As illustrated in FIG. 1, the automatic document feeder 300 includes a paper feed tray 302 attached to the housing 301, and an exit tray 303 formed in the housing 301. An original document sheet is set on the paper feed tray 302. When a user sets an original document sheet on the paper feed tray 302 and then inputs an instruction to feed the original document sheet (or an instruction to read the original document sheet) by operating the operation section 201a, the original document sheet is fed from the paper feed tray 302 to a conveyance path inside the housing 301. The original document sheet thus fed passes through the conveyance path to be discharged onto the exit tray 303 disposed below the paper feed tray 302. During this procedure, the original document sheet passes above the sub contact glass 203. The main body 200 reads an image from the original document sheet passing above the sub contact glass 203, and forms the image on a recording medium such as paper.

Figure 3:
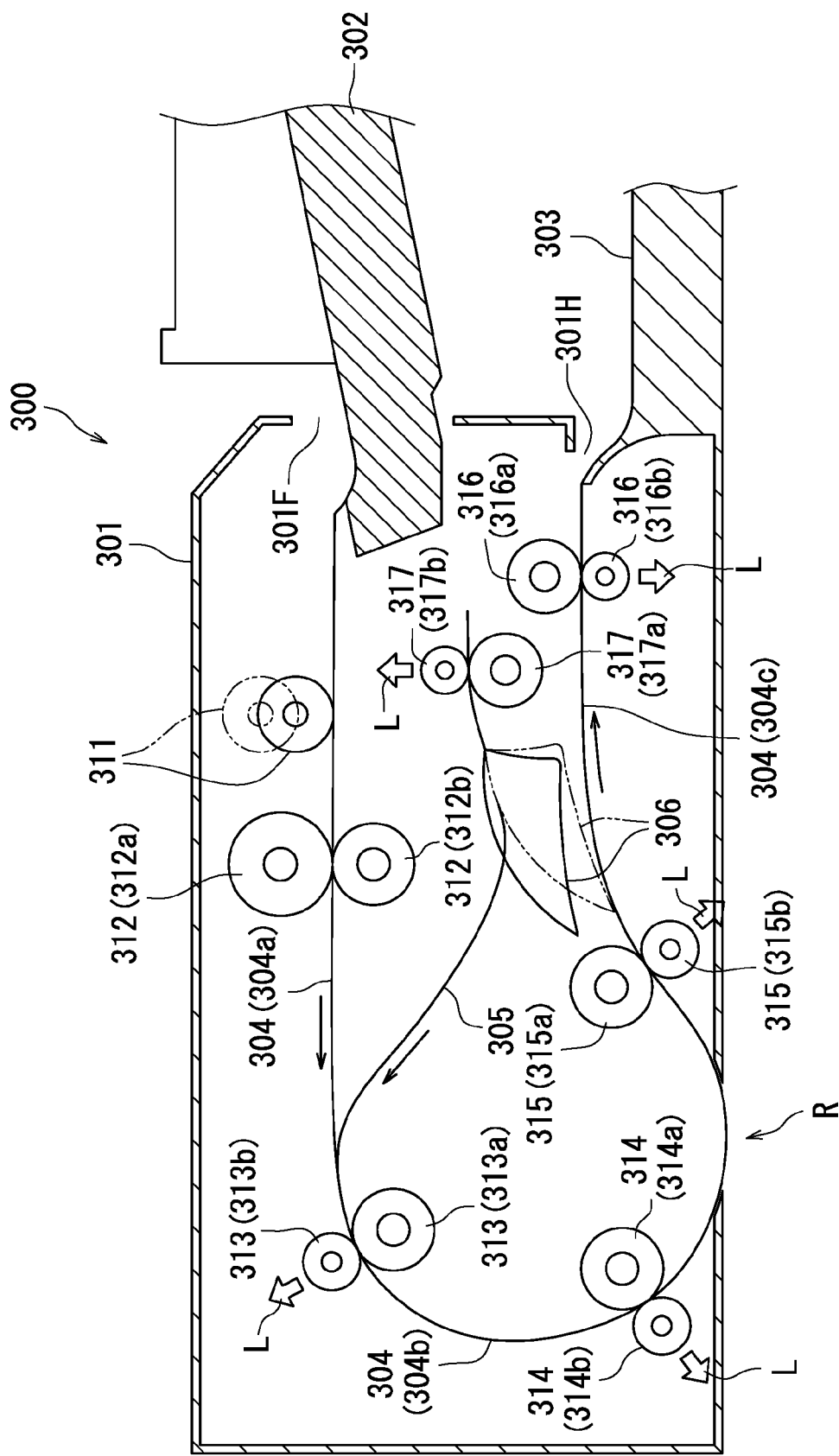
FIG. 3 is a cross-sectional view illustrating a conveyance path of the automatic document feeder of the embodiment of the present invention.

Subsequently, referring to FIG. 3, the structure of the automatic document feeder 300 will be described. FIG. 3 is a cross-sectional view illustrating a conveyance path of the automatic document feeder 300. As illustrated in FIG. 3, the paper feed tray 302 and the exit tray 303 overlap each other in the vertical direction, and are connected to each other through a substantially U-shaped conveyance path 304. The conveyance path 304 includes an upstream conveyance path 304a, a curved conveyance path 304b, and a downstream conveyance path 304c in this order. The upstream conveyance path 304a and the downstream conveyance path 304c overlap each other in the vertical direction, and an original document sheet fed to the conveyance path 304 makes a U-turn in the curved conveyance path 304b.

The paper feed tray 302 is attached correspondingly to a paper feed opening 301F formed in the housing 301, and in the vicinity of the paper feed opening 301F inside the housing 301, a pickup roller 311 and a paper feed roller pair 312 are disposed in this order along the conveyance path 304 (the upstream conveyance path 304a). The paper feed roller pair 312 includes a driving roller 312a and a driven roller 312b, and the driven roller 312b is in contact with the driving roller 312a so as to nip (pinch with pressure) an original document sheet together with the driving roller 312a. The paper feed roller pair 312 rotates owing to a driving force generated by a driving source and transmitted to the driving roller 312a. Besides, the pickup roller 311 is also a driven roller. For example, an endless belt is stretched between the pickup roller 311 and the driving roller 312a, and thus, the driving force is transmitted from the driving roller 312a to the pickup roller 311.

The conveyance path 304 extends from the paper feed opening 301F to an exit opening 301H formed in the housing 301, and on the downstream side from the paper feed roller pair 312, first to fourth conveyance roller pairs 313 to 316 are disposed in this order along the conveyance path 304. Among the first to fourth conveyance roller pairs 313 to 316, the fourth conveyance roller pair 316 is disposed in the vicinity of the exit opening 301H to function as an exit roller pair.

The first to fourth conveyance roller pairs 313 to 316 respectively include driving rollers 313a to 316a disposed inside (on the inner circumferential side of) the conveyance path 304, and driven rollers 313b to 316b disposed outside (on the outer circumferential side of) the conveyance path 304. The driven rollers 313b to 316b are respectively in contact with the driving rollers 313a to 316a so as to nip (pinch with pressure) an original document sheet together with the driving rollers 313a to 316a. Each of the first to fourth conveyance roller pairs 313 to 316 rotates owing to a driving force generated by a driving source and transmitted to the corresponding one of the driving rollers 313a to 316a.

Subsequently, referring to FIGS. 1 to 3, an operation of the image forming apparatus 100 will be described. When a user sets an original document sheet on the paper feed tray 302, a portion on the leading edge side of the original document sheet enters the housing 301 through the paper feed opening 301F, so as to be detected by a detection switch or a detection sensor. As a result, the pickup roller 311 on standby above the upstream conveyance path 304a lowers to nip (pinch with pressure) the original document sheet together with a guide plate of the upstream conveyance path 304a. Thereafter, when the user operates the operation section 201a to input an instruction to feed the original document sheet, the pickup roller 311, the paper feed roller pair 312, and the first to fourth conveyance roller pairs 313 to 316 start to rotate. As a result, the original document sheet is sent toward the paper feed roller pair 312 owing to the rotation of the pickup roller 311. The paper feed roller pair 312 nips the original document sheet and rotates to feed the nipped original document sheet to the conveyance path 304.

When the original document sheet is fed to the conveyance path 304, the first to third conveyance roller pairs 313 to 315 successively nip the original document sheet and rotate, so as to feed the nipped original document sheet to the downstream side of the conveyance path 304. Ultimately, the fourth conveyance roller pair 316 nips the original document sheet and rotates, so as to send the nipped original document sheet to the exit opening 301H. The original document sheet sent to the exit opening 301H is discharged onto the exit tray 303. During this procedure, the original document sheet makes a U-turn in the curved conveyance path 304b and then passes a document reading region R. The document reading region R corresponds to a region where the sub contact glass 203 (see FIG. 2) is provided. The main body 200 reads an image from the original document sheet when the original document sheet passes the document reading region R (above the sub contact glass 203) to form the image on a recording medium such as paper.

Figure 4:
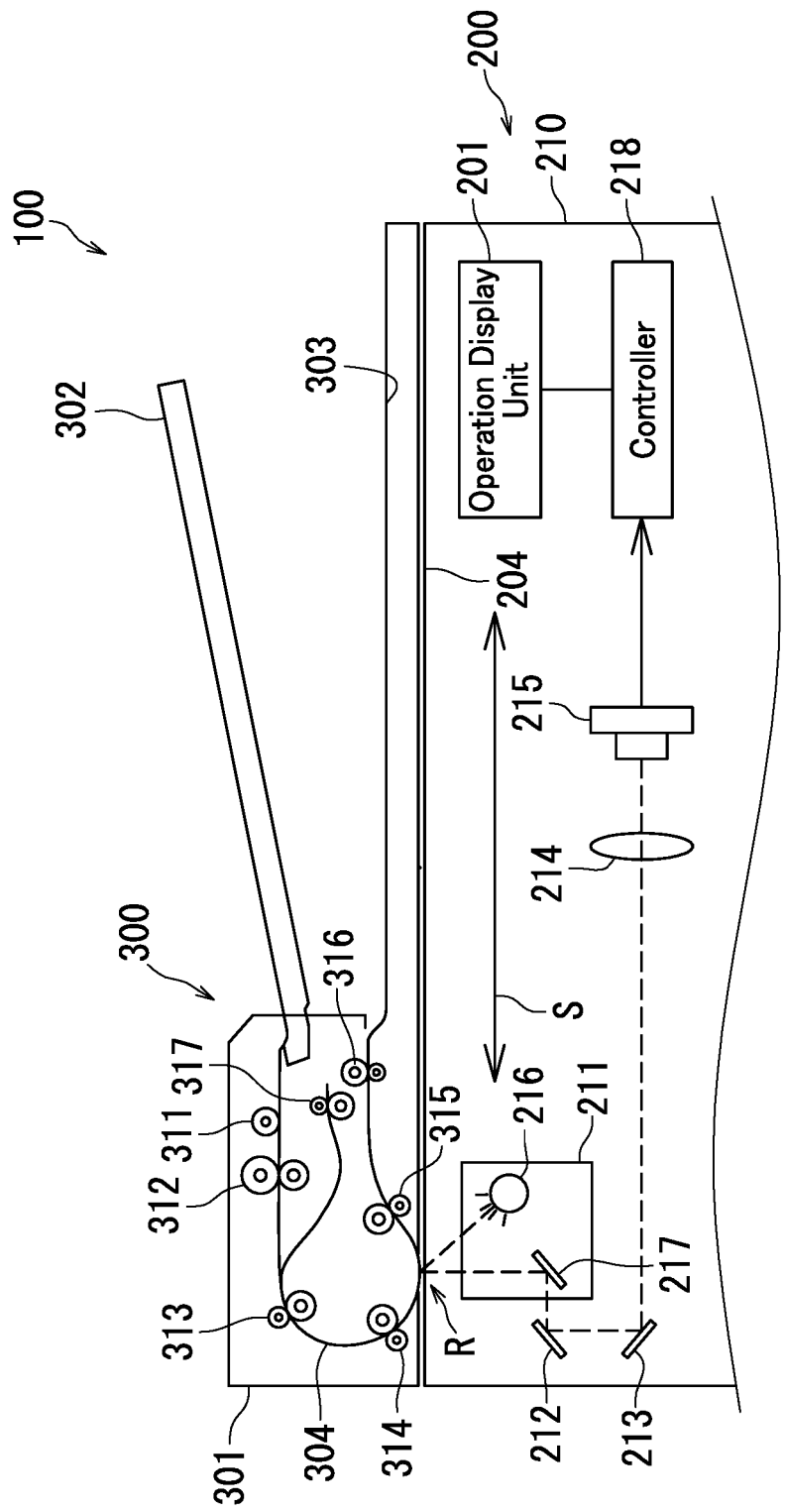
FIG. 4 is a cross-sectional view of a part of a main body of the image forming apparatus of the embodiment of the present invention.

Now, referring to FIG. 4, a document reading section included in the main body 200 will be described. FIG. 4 is a view of a part of the structure of the main body 200. It is noted that a branch member 306 illustrated in FIG. 3 is omitted in FIG. 4.

As illustrated in FIG. 4, the document reading section 210 includes a light source unit 211, two mirrors 212 and 213, an optical lens 214, a charge coupled device (CCD) 215, and the like.

The light source unit 211 is movable in a sub scanning direction S by a driving force generated by a driving source such as a motor. Besides, the light source unit 211 includes a light emitting diode (LED) light source 216, and a mirror 217. The LED light source 216 includes a large number of white LEDs arranged along a main scanning direction (a depth direction on FIG. 4).

If an original document sheet is placed on the main contact glass 202 (see FIG. 2), the LED light source 216 irradiates, through the main contact glass 202, the surface of the original document sheet with light while moving in the sub scanning direction S. The mirror 217 reflects the light having been reflected on the surface of the original document sheet toward the mirror 212. Then, the light reflected by the mirror 212 is guided by the mirror 213 toward the optical lens 214. The optical lens 214 collects the incident light to cause the collected light to enter the CCD 215. The CCD 215 has a photoelectric conversion elements or the like. The CCD 215 inputs an electric signal in accordance with the amount of light having entered from the optical lens 214 to a controller 218 as image data of the original document sheet. The controller 218 controls the respective elements of the main body 200 so as to form an image on a recording medium such as paper on the basis of a signal generated by the document reading section 210 (an output signal of the CCD 215).

If the automatic document feeder 300 feeds an original document sheet, the LED light source 216 irradiates, through the sub contact glass 203, the surface of the fed original document sheet. Thus, image data of the original document sheet is input to the controller 218.

The controller 218 is a computer including a central processing unit (CPU), a read only memory (ROM), a random access memory (RAM), an electrically erasable programmable read only memory (EEPROM), and the like. The CPU is a processor executing various arithmetic processing. The ROM is a nonvolatile memory section. The ROM stores beforehand information such as a control program for causing the CPU to execute the various arithmetic processing. The RAM is a volatile memory section, and the EEPROM is a nonvolatile memory section. The RAM and the EEPROM are used as a temporary memory (a working area) for the various arithmetic processing executed by the CPU.

In addition, the controller 218 comprehensively controls the image forming apparatus 100 by executing various control programs stored in the ROM beforehand by using the CPU. The controller 218 may be constituted by an electronic circuit such as an integrated circuit. For example, the controller 218 can be constituted by an integrated circuit such as an application specific integrated circuit (ASIC) or a digital signal processor (DSP). Besides, the controller 218 may have a structure in which a main controller for comprehensively controlling the image forming apparatus 100 and an engine controller for controlling the respective elements of the image forming apparatus 100 are separately provided.

If images are to be read from both sides of an original document sheet fed by the automatic document feeder 300, the branch member 306 rotates, as illustrated in FIG. 3, from a position shown with a solid line to a position shown with an alternate long and two short dashes line. Thus, the upper surface of the branch member 306 functions as a guide plate for the conveyance path 304, and an original document sheet having passed the document reading region R is sent toward a fifth conveyance roller pair 317.

The fifth conveyance roller pair 317 includes a driving roller 317a and a driven roller 317b, and the driven roller 317b is in contact with the driving roller 317a so as to nip (pinch with pressure) an original document sheet together with the driving roller 317a. The fifth conveyance roller pair 317 rotates owing to a driving force generated by a driving source and transmitted to the driving roller 317a.

After nipping the original document sheet, the fifth conveyance roller pair 317 sends the original document sheet through a sub conveyance path 305 to the upstream conveyance path 304a (or the curved conveyance path 304b). As a result, the original document sheet is turned over and passes the document reading region R again. At this point, the branch member 306 has restored to the position shown with the solid line in FIG. 3. Therefore, the original document sheet is sent toward the fourth conveyance roller pair 316 after passing the document reading region R again.

Furthermore, the automatic document feeder 300 further includes a pressure releasing mechanism. In the present embodiment, the pressure releasing mechanism moves, in conjunction with an operation of opening the housing 301 of the automatic document feeder 300 against the main body 200, the driven rollers 313b to 317b of the first to fifth conveyance roller pairs 313 to 317 respectively in directions away from the driving rollers 313a to 317a (directions of arrows L). The rotation axis provided for each of the driven rollers 313b to 317b of the first to fifth conveyance roller pairs 313 to 317 is supported movably in the direction of the arrow L and in an opposite direction to the arrow L. Therefore, in conjunction with the operation of opening the housing 301 of the automatic document feeder 300 against the main body 200, the contacts between the driving rollers 313a to 317a and the driven rollers 313b to 317b included in the first to fifth conveyance roller pairs 313 to 317 are released.

Accordingly, in a conveyance roller pair currently pinching with pressure (nipping) the original document sheet out of the first to fifth conveyance roller pairs 313 to 317, the pinch with pressure of the original document sheet is released. As a result, a user can remove the original document sheet without damaging it from the bottom side of the automatic document feeder 300 (from a position corresponding to the document reading region R).

Incidentally, as the driving sources for driving the driving rollers 312a to 317a, a single driving source may be used. In this case, the driving force is transmitted via a clutch to the driving roller 317a driving in reading both sides of an original document sheet. Alternatively, a plurality of driving sources may be used. As the driving source, for example, a motor can be used.

Figure 5:
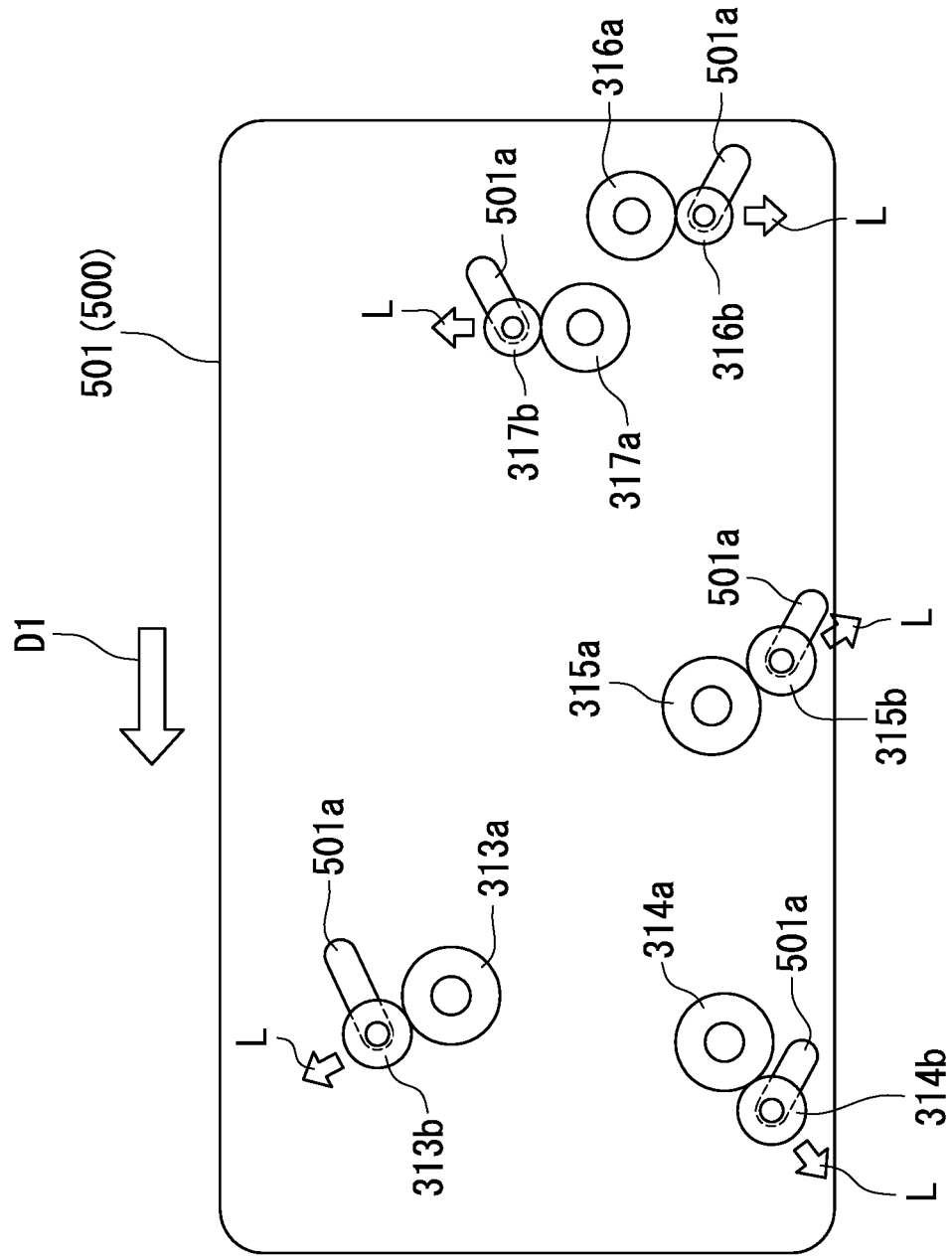
FIG. 5 is a plan view of an axis moving member of the embodiment of the present invention.

Subsequently, an example of the pressure releasing mechanism will be described with reference to FIGS. 5 to 7. FIG. 5 is a plan view of an axis moving member included in the pressure releasing mechanism of the present embodiment.

As illustrated in FIG. 5, in the present embodiment, the pressure releasing mechanism 500 includes the axis moving member 501 in a plate shape. The axis moving member 501 is slidably supported inside the housing 301 of the automatic document feeder 300. Specifically, the axis moving member 501 can slide in a direction vertical to axial directions of the rotation axes provided for the driven rollers 313b to 317b of the first to fifth conveyance roller pairs 313 to 317 (a direction of an arrow D1 and an opposite direction to the arrow D1). Besides, in the axis moving member 501, elongated holes 501a respectively corresponding to the driven rollers 313b to 317b of the first to fifth conveyance roller pairs 313 to 317 are formed. Each of the elongated holes 501a guides the rotation axis provided for the corresponding driven roller 313b, 314b, 315b, 316b or 317b.

The axis moving member 501 slides in the direction of the arrow D1 when the housing 301 of the automatic document feeder 300 is opened against the main body 200. At this point, the driven rollers 313b to 317b of the first to fifth conveyance roller pairs 313 to 317 are guided by the respective elongated holes 501a to move in the directions of the arrows L. As a result, the contacts between the driving rollers 313a to 317a and the driven rollers 313b to 317b included in the first to fifth conveyance roller pairs 313 to 317 are released.

Figure 6A:
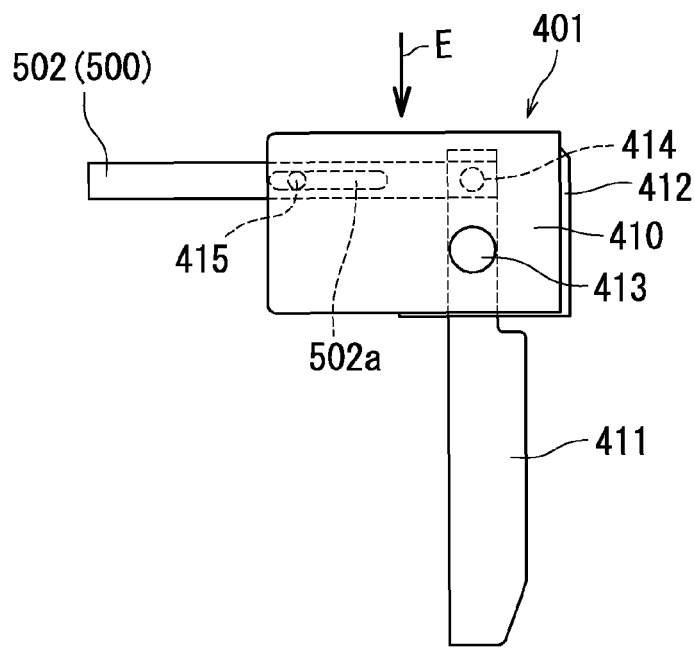
FIG. 6A is a side view of a first hinge portion of the embodiment of the present invention.
Figure 6B:
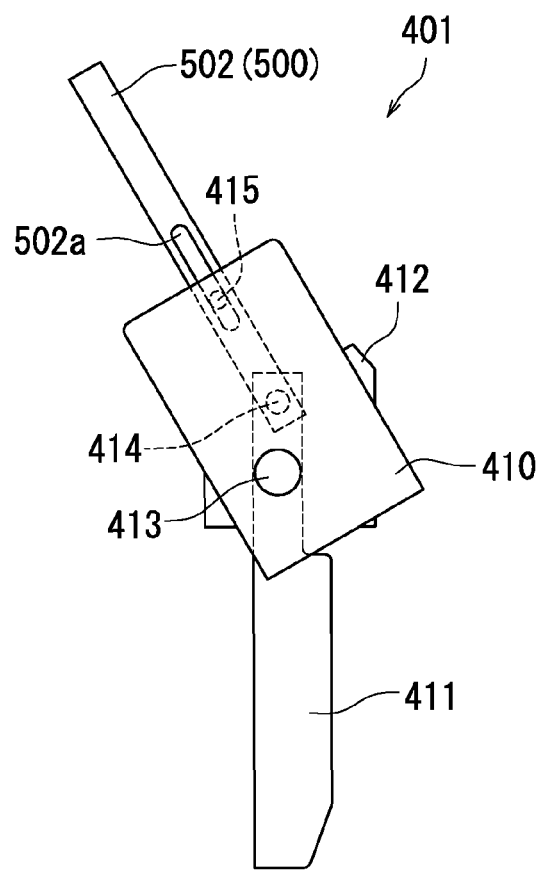
FIG. 6B is a side view of another state of the first hinge portion of FIG. 6A.

FIG. 6A is a side view of the first hinge portion 401. FIG. 6B is a side view of the first hinge portion 401 in another state. More specifically, FIG. 6A illustrates the first hinge portion 401 when the automatic document feeder 300 covers the upper surface of the main body 200 as illustrated in FIG. 1. On the other hand, FIG. 6B illustrates the first hinge portion 401 when the automatic document feeder 300 is lifted as illustrated in FIG. 2. Incidentally, the automatic document feeder 300 can be lifted up to a position where it is vertical to the upper surface of the main body 200.

As illustrated in FIGS. 6A and 6B, the first hinge portion 401 includes a first fixing portion 410, a second fixing portion 411, and a support 412. As illustrated in FIG. 2, the first fixing portion 410 is fixed on the housing 301 of the automatic document feeder 300. On the other hand, the second fixing portion 411 is inserted into and fixed on the main body 200 of the image forming apparatus 100.

Besides, as illustrated in FIGS. 6A and 6B, the first fixing portion 410 is supported by a first support shaft 413 of the support 412. Thus, the first fixing portion 410 rotates around the first support shaft 413 as illustrated in FIG. 6B when the housing 301 of the automatic document feeder 300 is lifted as illustrated in FIG. 2.

In the present embodiment, the first hinge portion 401 includes a projecting member 502. The projecting member 502 corresponds to a part of the pressure releasing mechanism 500, and is supported by a second support shaft 414 of the second fixing portion 411. Besides, an elongated hole 502a is formed in the projecting member 502, and a guide shaft 415 of the first fixing portion 410 is inserted into the elongated hole 502a. Therefore, when the housing 301 of the automatic document feeder 300 is lifted as illustrated in FIG. 2, the projecting member 502 rotates around the second support shaft 414, and in addition, is guided through engagement between the guide shaft 415 and the elongated hole 502a so as to further project from the first fixing portion 410 as illustrated in FIG. 6B. The projecting member 502 projects in this manner because the rotation axis (the second support shaft 414) of the projecting member 502 is disposed in a different position from the rotation axis (the first support shaft 413) of the first fixing portion 410.

A cam mechanism is provided between the projecting member 502 and the above-described axis moving member 501, and a force generated by the projecting operation of the projecting member 502 is transmitted through the cam mechanism to the axis moving member 501, and hence the axis moving member 501 slides in the direction of the arrow D1 (see FIG. 5). When this structure is employed, if the housing 301 of the automatic document feeder 300 is opened as illustrated in FIG. 2, in conjunction with the operation of the first hinge portion 401 described with reference to FIGS. 6A and 6B, the contacts between the driving rollers 313a to 317a and the driven rollers 313b to 317b included in the first to fifth conveyance roller pairs 313 to 317 are released as illustrated in FIG. 5.

Figure 7:
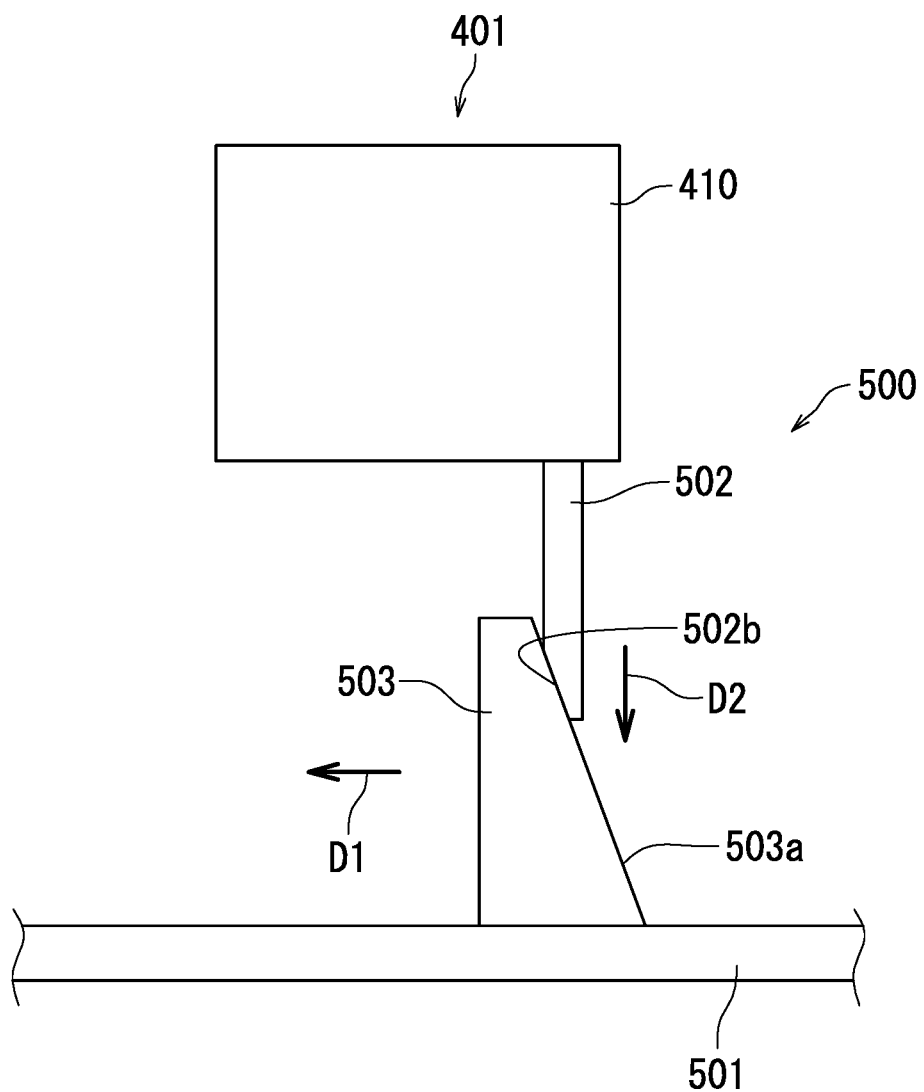
FIG. 7 is a view of a cam mechanism of the embodiment of the present invention.

FIG. 7 is a view of the cam mechanism (the pressure releasing mechanism 500) of the present embodiment. More specifically, FIG. 7 illustrates the cam mechanism seen from a direction of an arrow E of FIG. 6A. As illustrated in FIG. 7, the axis moving member 501 is provided with a cam portion 503 having an inclined surface 503a. The cam portion 503 corresponds to a part of the pressure releasing mechanism 500, and is disposed in a position where the projecting member 502 is in contact with the inclined surface 503a.

In the present embodiment, an inclined surface 502b is also formed in a tip portion of the projecting member 502, and the inclined surface 502b of the projecting member 502 is engaged with the inclined surface 503a of the cam portion 503.

If the housing 301 of the automatic document feeder 300 is lifted as illustrated in FIG. 2 and the projecting member 502 projects in a direction vertical to the axis moving member 501 (a direction of an arrow D2) as illustrated in FIG. 7, the inclined surface 502b of the projecting member 502 slides on the inclined surface 503a of the cam portion 503. At this point, the inclined surface 502b of the projecting member 502 presses the inclined surface 503a of the cam portion 503 in the direction of the arrow D1. Therefore, the axis moving member 501 slides in the direction of the arrow D1. In this manner, since the axis moving member 501 is provided with the cam portion 503 engaged with the projecting member 502, the axis moving member 501 can be slid.

Incidentally, the shape of the tip portion of the projecting member 502 is not especially limited, and may be any shape as long as the inclined surface 503a of the cam portion 503 can be pressed in the direction of the arrow D1.

The present embodiment has been described so far with reference to FIGS. 1 to 7. According to the present embodiment, in conjunction with the operation of opening the housing 301 of the automatic document feeder 300 against the main body 200 of the image forming apparatus 100, the contacts between the driving rollers 313a to 317a and the driven rollers 313b to 317b included in the first to fifth conveyance roller pairs 313 to 317 are released. Accordingly, in a conveyance roller pair currently pinching with pressure (nipping) an original document sheet out of the first to fifth conveyance roller pairs 313 to 317, the pinch with pressure of the original document sheet is released. As a result, even when sheet jamming occurs, if a part of the original document sheet is exposed on the lower surface of the housing 301 of the automatic document feeder 300 in the position corresponding to the document reading region R, a user can lift the housing 301 of the automatic document feeder 300 to remove the original document sheet without damaging it from the bottom side of the automatic document feeder 300.

Furthermore, according to the present embodiment, even if sheet jamming occurs with an original document sheet nipped by the fifth conveyance roller pair 317 in reading images from both sides of the original document sheet, the nip of the original document sheet by the fifth conveyance roller pair 317 can be released by lifting the housing 301 of the automatic document feeder 300. Accordingly, if a part of the original document sheet is exposed in the position corresponding to the document reading region R at this point, the user can lift the housing 301 of the automatic document feeder 300 to remove the original document sheet without damaging it from the bottom side of the automatic document feeder 300.

The specific embodiment of the present invention has been described so far, and it is noted that the present invention is not limited to the aforementioned embodiment but the embodiment can be variously modified.

Figure 8:
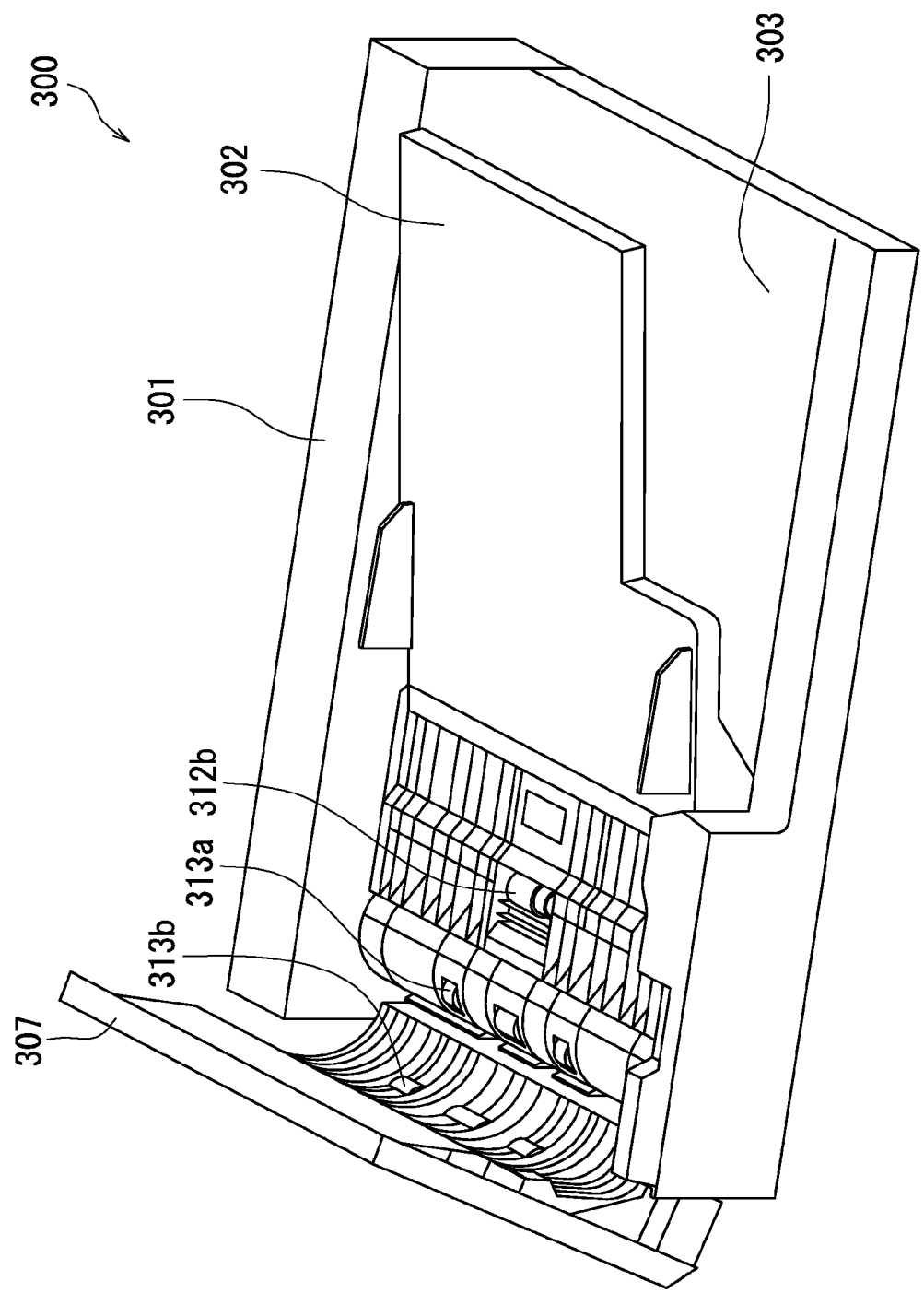
FIG. 8 is a perspective view of another example of the automatic document feeder of the embodiment of the present invention.

For example, as illustrated in FIG. 8, the housing 301 of the automatic document feeder 300 may have a top cover 307 (a cover for unjamming processing). FIG. 8 is a perspective view of another example of the automatic document feeder 300 of the present embodiment.

As illustrated in FIG. 8, when the top cover 307 is opened, the upstream conveyance path 304a and a part of the curved conveyance path 304b are exposed outside. Furthermore, if the top cover 307 rotatably supports the driven roller 313b of the first conveyance roller pair 313 provided on the upstream conveyance path 304a or the curved conveyance path 304b, the contact between the driving roller 313a and the driven roller 313b included in the first conveyance roller pair 313 is released by opening the top cover 307. Accordingly, a user can open the top cover 307 to release the nip (pinch with pressure) of an original document sheet by the first conveyance roller pair 313.

Besides, although the axis moving member 501 in a plate shape is used in the embodiment of the present invention, the shape of the axis moving member 501 is not especially limited as long as the rotation axes of the driven rollers 313b to 317b of the first to fifth conveyance roller pairs 313 to 317 can be guided.

Furthermore, the embodiment of the present invention describes a case where the driven rollers 313b to 317b of the first to fifth conveyance roller pairs 313 to 317 are detached respectively from the driving rollers 313a to 317a in conjunction with the operation of opening the housing 301 of the automatic document feeder 300 against the main body 200, but the present invention is not limited to this structure. The driven rollers 313b to 317b of the first to fifth conveyance roller pairs 313 to 317 may be moved in a direction away respectively from the driving rollers 313a to 317a to such an extent to reduce the pinching pressures of the first to fifth conveyance roller pairs 313 to 317.

Besides, the embodiment of the present invention describes a case where the driven rollers 313b to 317b of the first to fifth conveyance roller pairs 313 to 317 are moved in a direction away respectively from the driving rollers 313a to 317a in conjunction with the operation of opening the housing 301 of the automatic document feeder 300 against the main body 200, but the present invention is not limited to this structure. The driving rollers 313a to 317a of the first to fifth conveyance roller pairs 313 to 317 may be moved in a direction away respectively from the driven rollers 313b to 317b. Alternatively, the two rollers of each of the first to fifth conveyance roller pairs 313 to 317 may be respectively moved. In this case, in the axis moving member 501, elongated holes for respectively guiding the rotation axes of the driving rollers 313*a* to 317*a* are formed in addition to the elongated holes 501*a*.

Furthermore, the sub contact glass 203 is provided on the upper surface of the main body 200 for reading an image from an original document sheet fed by the automatic document feeder 300 in the embodiment of the present invention, but the present invention is not limited to this structure. Without providing the sub contact glass 203, a partial region of the contact glass may be used as the document reading region R.

Besides, although one axis moving member 501 is used in the embodiment of the present invention, a plurality of axis moving members may be used.

Furthermore, although one projecting member 502 is used in the embodiment of the present invention, a plurality of projecting members may be used.

Besides, although one cam portion 503 is used in the embodiment of the present invention, a plurality of cam portions may be used.

Furthermore, although the projecting member 502 is provided on the hinge portion 400 (the first hinge portion 401) in the embodiment of the present invention, the projecting member 502 may be provided on a portion different from the hinge portion 400.

Besides, the embodiment of the present invention describes a case where the contacts between the driving rollers 313*a* to 317*a* and the driven rollers 313*b* to 317*b* included in the five conveyance roller pairs 313 to 317 are released. In other words, a case where the automatic document feeder 300 includes the five conveyance roller pairs is described, but the number of conveyance roller pairs included in the automatic document feeder 300 is not limited to five.

Furthermore, the embodiment of the present invention describes a case where the image forming apparatus 100 is a multifunctional peripheral, but the present invention is applicable to an image forming apparatus such as a printer, a facsimile machine, or a copier.

In addition, the above-described embodiment can be variously changed or modified without departing from the scope of the present invention.

The invention claimed is:

1. An automatic document feeder, comprising:
   a housing openably and closably attached to a main body of an image forming apparatus;
   a conveyance roller pair configured to pinch an original document sheet with pressure and feed the original document sheet;
   a pressure releasing mechanism configured to reduce a pinching pressure of the conveyance roller pair or detach one roller of the conveyance roller pair from the other roller in conjunction with an operation of opening the housing against the main body; and
   a hinge portion openably and closably connecting the housing to the main body, wherein
   the pressure releasing mechanism includes an axis moving member that is slidably supported inside the housing and has an elongated hole formed therein for guiding an axis of one roller of the conveyance roller pair, and
   the axis moving member slides in conjunction with an operation of the hinge portion, in opening the housing against the main body, to reduce the pinching pressure of the conveyance roller pair, or detach one roller of the conveyance roller pair from the other roller.

2. The automatic document feeder according to claim 1, wherein
   the pressure releasing mechanism includes a projecting member provided on the hinge portion, and
   the projecting member projects from the hinge portion when the housing is opened against the main body.

3. The automatic document feeder according to claim 2, wherein
   the axis moving member slides when the projecting member projects from the hinge portion.

4. The automatic document feeder according to claim 3, wherein
   the pressure releasing mechanism further includes a cam portion provided in the axis moving member and engaged with the projecting member.

5. An image forming apparatus, comprising:
   the automatic document feeder according claim 1; and
   the main body, wherein
   the main body includes a document reading section reading an image from an original document sheet fed by the automatic document feeder, and forms an image on a recording medium on the basis of a signal generated by the document reading section.

\* \* \* \* \*